United States Patent

[11] 3,547,373

[72] Inventor John J. Bundschuh
 Rochester, N.Y.
[21] Appl. No. 731,562
[22] Filed May 23, 1968
[45] Patented Dec. 15, 1970
[73] Assignee Eastman Kodak Company
 Rochester, N.Y.
 a corporation of New Jersey

[54] CARTRIDGE AND MEANS FOR LOCATING A CARTRIDGE ON A PROJECTOR OR THE LIKE
 21 Claims, 5 Drawing Figs.
[52] U.S. Cl. .................................................. 242/197, 352/78
[51] Int. Cl. .................................................. G03b 1/04, G11b 15/32, G11b 23/04
[50] Field of Search .................................................. 242/193, 194, 197—200, 71.1, 71.2, 205; 352/72—78, 27

[56] References Cited
UNITED STATES PATENTS
| | | | |
|---|---|---|---|
| 2,384,637 | 9/1945 | Ownes.......................... | 242/71.2 |
| 3,227,508 | 1/1966 | Bavaro ........................ | 352/27 |
| 3,275,253 | 9/1966 | Cherniavskyj................ | 242/197 |
| 3,434,783 | 3/1969 | Sakaki et al. ................. | 352/72 |

*Primary Examiner*—Leonard D. Christian
*Attorneys*—Robert W. Hampton and G. Herman Childress ABSTRACT: A cartridge for receiving a reel of motion picture film has mounting structure on one face thereof for accurately positioning or locating the cartridge with respect to a surface of a motion picture projector. The cartridge face has surface formations thereon and other structural features which cooperate with corresponding structures on the surface of the cartridge to determine and maintain the position of the cartridge in directions parallel to the cartridge face and to locate the cartridge face in the desired plane with respect to the projector surface.

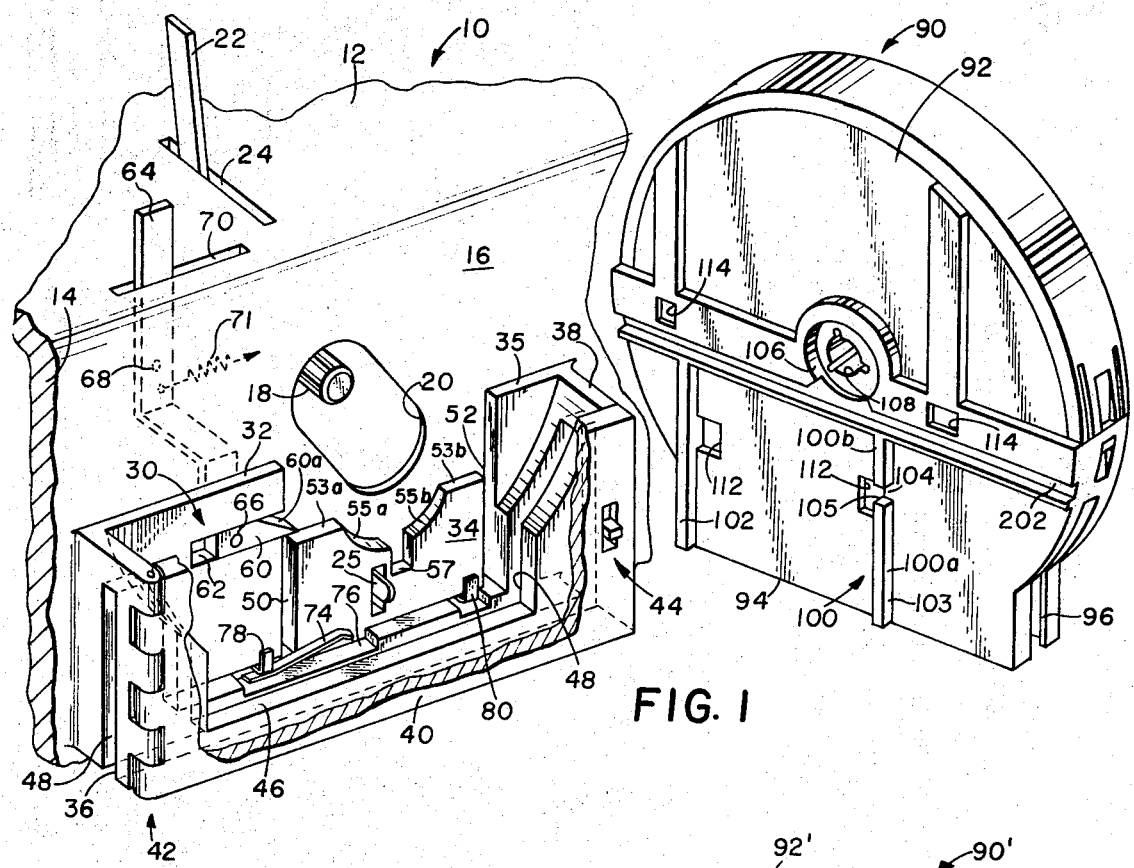
FIG. 1
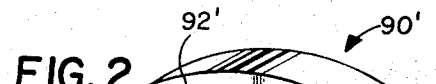
FIG. 2
FIG. 3
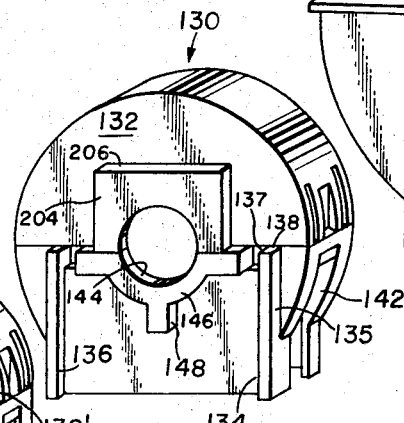
FIG. 4
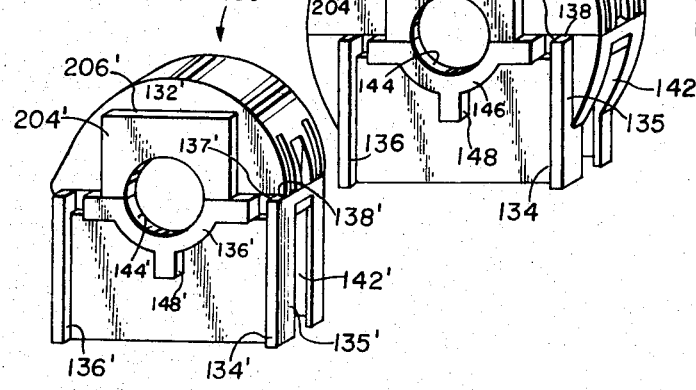
JOHN J. BUNDSCHUH
INVENTOR.
BY J. Herman Childress
Robert W. Hampton
ATTORNEYS

CARTRIDGE AND MEANS FOR LOCATING A CARTRIDGE ON A PROJECTOR OR THE LIKE

CROSS REFERENCE TO RELATED APPLICATIONS

Reference is made to the following commonly assigned U.S. Pat. applications: Ser. No. 685,588, entitled, "Cartridge," filed Nov. 24, 1967 in the name of John J. Bundschuh; now abandoned, Ser. No. 685,616, entitled, "Cinematographic Projectors or the Like and Cartridges for Use Therewith," filed Nov. 24, 1967 in the name of John J. Bundschuh et al. Ser. No. 731,561, entitled "Cartridge," filed May 23, 1968 in the name of John J. Bundschuh; and Ser. No. 692,815, entitled, "Cartridge and Reel Supporting Means for Cartridge-Loading Motion Picture Projectors" filed Dec. 22, 1967, now abandoned, in the name of Robert J. Roman.

BACKGROUND OF THE INVENTION

1. Field of the Invention

This invention relates to motion picture projectors and cartridges therefore and, more particularly, the invention relates to a cartridge construction which is adapted to be mounted on a motion picture projector and to such a projector having means for accommodating and locating cartridges.

2. Description of the Prior Art

In the copending patent applications Ser. No. 685,588 and Ser. No. 685,616, cartridges and motion picture projectors are described having means to accurately locate and hold a cartridge on a projector. These mounting and holding means include interlocking surface formations and latch means which establish the orientation or position of the cartridge with respect to a projector surface and which also determine the plane in which the cartridge is located. In accordance with said applications the cartridge may be mounted by moving it in a direction substantially parallel to the axis of a projector spindle or it may be moved into the mounted position in a direction perpendicular to the spindle axis. However, the constructions described before did not include features which allowed a cartridge to be moved into the mounted position in either of two directions, each of which is perpendicular to the spindle axis. Moreover, the need to mount cartridges of comparatively small and large reel capacities (e.g. 50 and 400 feet capacity reels) has created a need for cartridge and projector structures which permit mounting of substantially any cartridge capacity on a projector with the same projector locating means. Moreover, it is desirable to simplify the mounting and latching structure.

SUMMARY OF THE INVENTION

Accordingly, among the several objects of the invention may be noted the provision of a cartridge construction which can be loaded onto a motion picture projector or the like by moving the cartridge in either of two directions substantially parallel to a face of the cartridge; the provision of a cartridge having improved means for locating and holding the cartridge in place with respect to the motion picture projector, and to a motion picture projector having improved means for accommodating and locating such a cartridge; the provision of improved mounting and locating means for a cartridge which permits the use of the same structure and dimensions on cartridges with comparatively small and large reel capacities; the provision of an improved cartridge construction and motion picture projector construction which permits the use of simple, efficient, and inexpensive means for mounting and locating the cartridge on the projector; and the provision of cartridge mounting structure which can be common to various sizes of cartridges even though the axis of the opening through the cartridges for the spindle varies with respect to the mounting and locating structure.

A cartridge according to the present invention comprises a face positionable against a surface of a motion picture projector or the like and having an elongate rib which is adapted to engage a portion of the projector surface for positioning the cartridge on the projector. A surface transverse to the length of the rib is adapted to cooperate with a cooperating surface on the projector for establishing and maintaining the position of the cartridge on the projector in a direction parallel to the length of the rib.

Means for mounting a cartridge on a projector or the like includes means on the projector for positioning a rib on a cartridge in a first plane. A locating member is engageable with a portion of the cartridge for establishing and maintaining the position of the cartridge on the projector in a direction perpendicular to the rib on the cartridge.

BRIEF DESCRIPTION OF THE DRAWINGS

FIG. 1 is a perspective view of a cartridge of the invention and of a portion of a motion picture projector or the like incorporating mounting and locating structure for a cartridge in accordance with the invention;

FIGS. 2—4 are views illustrating cartridges of three different reel capacities constructed to be mounted on an located by the projector structure illustrated in FIG. 1.

Corresponding reference characters indicate corresponding parts throughout the several views of the drawings.

DESCRIPTION OF THE PREFERRED EMBODIMENTS

Figure 5:
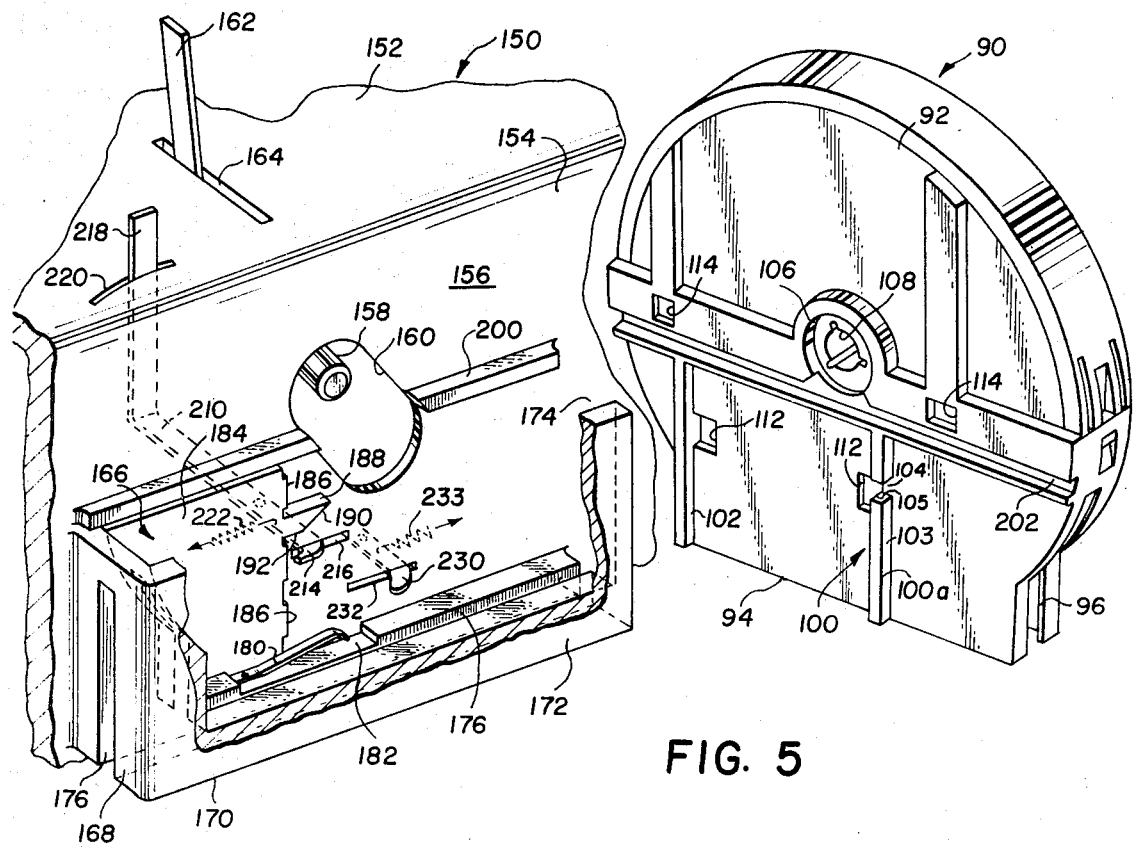
FIG. 5 is a perspective view similar to FIG. 1 illustrating a modified projector construction.

Referring to the drawings, a portion of a motion picture projector or the like is generally designated 10. The portions of the projector not illustrated in FIG. 1 may be of any suitable construction, such as the projector described and illustrated in the before-mentioned copending U.S. Pat. application Ser. No. 685,616. The portion of the projector illustrated in FIG. 1 comprises an upper wall 12 and a lower wall 14 which is substantially perpendicular to the upper wall. Wall 14 has a front surface 16 against which the cartridges described later are adapted to be mounted.

The projector has a rotatable spindle 18 which is adapted to be extended and retracted through an elongate oblong opening 20 in wall 14. Operating lever 22 projecting through a slot 24 in wall 12 is used for retracting the spindle through hole 20 until the spindle is out of the plane of face 16. The spindle can be extended through the opening 20 for engaging and supporting a reel of motion picture film or the like after a cartridge containing the film has been positioned against face 16. The spindle may be held in the retracted position illustrated by latch means (not shown). The latch means can be released automatically in response to mounting of a cartridge on the projector by means of a latch release member 25 which senses the presence of a cartridge on the projector. The mechanism for mounting the spindle for axial movement and for releasing it from the retracted position can be of any suitable construction, including the construction described in the before-mentioned patent application entitled "Cartridge" by John J. Bundschuh. Spindle 18 is also preferably mounted for movement along an arcuate path so that the spindle can be located either adjacent the upper end of the opening 20 as shown in FIG. 1 or adjacent the lower end portion of the opening. This permits the spindle to be used with rolls of film having their axis located at various elevations with respect to the surface 16. The copending patent application of Robert J. Roman, entitled "Cartridge and Reel Supporting Means for Cartridge-Loading Motion Picture Projectors" discloses a spindle mounted for arcuate movement.

At the lower portion of wall 14 there is a chamber 30 formed by plates 32, 34 and 35 which are secured to surface 16, end members 36 and 38 which project outwardly from surface 16 to form end wall, and a door or closure member 40 which is mounted to swing from a closed position illustrated in FIG. 1 to an open position (not shown) about a hinge 42 at the outer end of end member 36. Door 40 is held closed by suitable latch means generally designated 44. The bottom of the chamber 30 is defined by a wall 46. A slot 48 extends through the side members 36 and 38 and through the bottom wall 46 to permit passage of film-stripping means (not shown) through the slot and through an aligned slot or opening in the cartridges for removing film from the cartridges.

The side edges of plate 34 are spaced from the adjacent side edges of plates 32 and 35 to form two substantially parallel grooves or recesses 50 and 52 at opposite sides of the opening 20 for the spindle. These grooves or recesses are open at the top as illustrated in the drawings so that the cartridge can be moved downwardly along face 16 during mounting of the cartridge on the projector in a manner described more fully hereinafter. The upper edge of plate 34 preferably includes straight, substantially coplanar end portions 53a and 53b connected by generally arcuate portions 55a and 55b and a centrally located slot 57. The configuration of the upper edge of plate 34 and the provision of recesses 50 and 52 permits the projector 10 to receive, accommodate and locate cartridges of types other than those disclosed herein, e.g. cartridges of the type disclosed in the before-mentioned Bundschuh application Ser. No. 685,588.

A locating and latch member 60 is movable lengthwise in a slot or opening 62 formed in plate 32. The location of slot 62 is such that the member 60 is slidable in a direction substantially perpendicular to the length of recess or groove 50. Member 60 has a tapered end portion 60a which is adapted to project from slot 62 and into a position over the upper end of groove or recess 50 to thereby block upward movement of a portion of the cartridge when such is positioned within this groove. As explained more fully later, the member 60 also establishes the vertical position of a cartridge with respect to the surface 16 of the projector. Member 60 is connected to a lever 64 by a pivot 66. The lever is pivoted at 68 to projector wall 14 and the end portion of the lever opposite from the member 60 projects through a slot 70 in projector wall 12 so that the member 60 can be retracted into slot 62 and out of alignment with the upper end of groove 50 by finger pressure exerted against the projecting end portion of the lever. Lever 64 is biased toward the position shown by a spring diagrammatically illustrated at 71.

The projector 10 preferably has a leaf spring 74 which projects out of a recess 76 in bottom wall 46. During movement of a cartridge into the chamber 30 the spring can be deflected downwardly until it is substantially fully contained within the recess 76. When the cartridge is released the spring 74 biases the cartridge upwardly to help establish and maintain proper alignment of the member 60 with a portion of the cartridge.

A pair of spaced latching and locating members are indicated at 78 and 80. These members include upwardly projecting finger portions which are spaced from the outer surface of plates 32 and 34 by a distance sufficient to permit them to enter an opening in the bottom of the cartridges. These members function to hold the lower portion of the cartridge in proper location with respect to the surface 16 of the projector and to prevent movement of the cartridge away from the surface.

A cartridge of the invention is generally designated 90 in FIG. 1 and such cartridge may have the capacity to receive a reel containing approximately 400 feet of film. The cartridge illustrated is of the type described in the beforementioned copending patent application entitled "Cartridge," Ser. No. 731,561. Cartridge 90 has a face generally designated 92 which is adapted to abut or be in close-fitting relation with the surface 16 of the projector when the cartridge is properly mounted on the projector. As is apparent from FIG. 1, the lower portions of the cartridge are shaped and dimensioned so that these portions of the cartridge fit snugly within the chamber 30 on the projector. More specifically, the cartridge has a lower edge 94 which is adapted to be engaged by spring 74. The cartridge is open at the bottom and the members 78 and 80 fit within the opening at the bottom of the cartridge to prevent movement of the cartridge away from surface 16. The cartridge has slots 96 which extend from the open bottom of the cartridge upwardly into both sides of the cartridge. The slots are positioned to be aligned with the slot 48 in end walls 36 and 38 of the projector so that the film-stripping mechanism previously mentioned can enter the cartridge through its open bottom and through the slots 96.

A pair of elongate ribs 100 and 102 extend along face 92 of the cartridge from the lower end thereof upwardly to approximately midway along the cartridge. These ribs are substantially parallel to each other and are spaced from each other so that they can be received with the grooves or recesses 50 and 52, respectively, in the surface 16 of the projector. The rib 100 has side edges 103 and 105 which substantially abut plates 32 and 34, respectively, to prevent movement of the cartridge in a left-to-right direction as viewed in FIG. 1. Rib 100 comprises a lower portion 100a and an upper portion 100b separated by a gap 104. The gap is located along rib 100 so that when the rib is positioned within recess 50 the end portion 60a of member 60 can be received in the gap. Since leaf spring 74 biases the cartridge upwardly, the upper end of rib portion 100a is biased into contact with the lower edge of member 60. This engagement between member 60 and the upper end of rib portion 100a determines the vertical position of the cartridge with respect to surface 16.

The cartridge has an opening 106. The projector spindle 18 is adapted to extend through opening 106 and into the central core or hub portion 108 of a reel inside the cartridge for supporting the reel for rotation within the cartridge. The locating structure on the cartridge and the projector cooperate to position the opening 106 so that it is aligned with the axis of the spindle.

In order to mount the cartridge 90 on projector 10, lever 22 is moved to the illustrated position for retracting the spindle 18. Then lever 64 is swung to the right (as viewed in FIG. 1) to retract member 60 within the slot 62 until the end portion 60a is withdrawn from above the recess or groove 50. Alternatively, the member 60 may remain in the position illustrated and be cammed to its retracted position by engagement between rib 100 and the tapered surface 60a during insertion of the cartridge into the chamber 30. Then the cartridge 90 is positioned above chamber 30 with face 92 of the cartridge against or in close proximity to the surface 16 of the projector and the cartridge is moved downwardly along surface 16 until the lower portions of the cartridge are received within the chamber 30. As this movement occurs the ribs 100 and 102 enter and move along the grooves 50 and 52 respectively until the cartridge is bottomed in the recess. The grooves serve to guide movement of the cartridge as well as locate the cartridge in a transverse direction. As the cartridge reaches its lowermost position, the lower edge of face 92 of the cartridge is received between the mounting and locating members 78 and 80 and the surface 16 of the projector thereby positioning the cartridge in the desired plane with respect to the projector. Lever 64 is then released and it returns to the position illustrated under the biasing force of spring 71. As this occurs the end portion 60a of member 60 enters the gap 104 between the two spaced portions of rib 100. Because end portion 60a is tapered as illustrated in the drawings, the lower end of rib portion 100b can engage and ride up on the tapered surface, thereby urging the entire cartridge upwardly until the lower edge of member 60 engages the upper end of the rib portion 100a. This movement is aided by spring 74 which contacts lower edge 94 of the cartridge and biases the cartridge upwardly. The relative position of the various parts of the projector and the cartridge, including the ribs and the recesses, member 60 and gap 104, etc., is such that the opening 106 and the hub portion 108 of the reel are located with respect to spindle 18 so that the spindly, when extended, will pass through opening 106 and enter the hub portion 108 of the reel. This movement of the spindle is automatically effected during mounting of the cartridge in response to tripping of the release lever 25 by the lower edge 94 of the cartridge. This operation is more fully described in the before-mentioned patent application entitled "Cartridge," Ser. No. 685,588.

The cartridge can be removed from the projector by moving lever 22 to the position illustrated in FIG. 1 to thereby retract spindle 18, moving lever 64 to the right as viewed in FIG. 1 to retract member 60 into slot 62, and lifting upwardly on the cartridge to withdraw the lower portion thereof from chamber 30.

In the event it is desired to use the cartridge 90 on a projector which does not include a retractable spindle mechanism, then the cartridge can be mounted on the projector by first releasing latch 44 and swinging door 40 open. Then the cartridge is moved into chamber 30 in a direction substantially parallel to the axis of spindle 18 until the spindle enters opening 106 and is positioned within the hub portion 108 of the reel. During this movement the ribs 100 and 102 are aligned with and enter into the grooves 50 and 52, respectively. For this type of mounting it is preferred (but not necessary) for the member 60 to be withdrawn or retracted into slot 62. Also, the cartridge may be tilted as it is moved toward surface 16 so that the lower edge 94 leads the upper end of face 92. This permits the lower edge 94 of the cartridge to be positioned over the top of locating member 78 and 80 and then moved downwardly during the mounting operation. After the cartridge is properly positioned within the chamber, the door 40 is closed and latch means 44 engaged.

Cartridge 90 further comprises a lower pair of openings 112 and an upper pair of openings 114 which may be used for receiving suitable latching structure (not shown) for holding the cartridge against the projector face. Suitable clamping or latching structure of this type is illustrated in the before-mentioned patent application entitled "Cartridge," Ser. No. 731,561, and need not be described in detail here.

One of the advantages of the mounting and locating structure illustrated in FIG. 1 is that it can be used with cartridges (such as shown in FIGS. 1–4) of various sizes and shaped. By way of example, the cartridges illustrated in FIGS. 1, 2, 3 and 4 may be dimensioned so that they can receive reels with film capacities of approximately 400 feet, 200 feet, 100 feet and 50 feet of film, respectively. The cartridges shown in FIGS. 2–4 will now be described.

The cartridge illustrated in FIG. 2 is similar to the cartridge of FIG. 1 and, accordingly, the part numbers used in FIG. 1 have been used in FIG. 2 together with a prime (') to designate the same or similar parts. The cartridge 90' has an opening 120 for receiving spindle 18. As will be apparent from a comparison of FIGS. 1 and 2, opening 120 is spaced further from the rib 100' than the opening 106 is spaced from the rib 100. Also, the opening 120 is nearer to the lower edge of the cartridge than is the opening 106 in the cartridge 90. The need for this relocation of the opening 120 occurs because: (1) cartridge 90' accommodates a reel having a smaller diameter than the cartridge 90 while the lower edge of both cartridges occupy substantially the same vertical position on surface 16 when the cartridges are mounted on the projector, and (2) spindle 18 moves in an arcuate path from the position illustrated in the drawings as it is lowered to a height where it can pass through opening 120. This relocation of the opening permits cartridge 90' to have the same mounting and locating structural features as the cartridge 90, even though the cartridges accommodate reels of different capacities. In other respects, cartridge 90' is the same as the cartridge 90, and its mounting on the projector is the same as previously described for cartridge 90.

The 100 feet cartridge illustrated in FIG. 3 is generally designated 130, and it comprises a face 132 which is adapted to fit against or in close proximity to surface 16 on the projector. Projecting from face 132 is a pair of spaced, generally parallel elongate ribs 134 and 136 which are adapted to be received in grooves or recesses 50 and 52, respectively. Rib 134 has side edges 135 and 137 which substantially abut plates 32 and 34 to prevent any significant movement of the cartridge in a left-to-right direction (as viewed in FIG. 1). Rib 134 thus corresponds to rib 100, and the length of rib 134 is substantially the same as the length of the portion 100a of rib 100. Thus the upper end 138 of rib 134 is adapted to bear against the lower surface of latch member 60 thereby to determine the vertical position of cartridge 130 with respect to surface 16. Similarly, the width of rib 134 (like rib 100) is selected with respect to the width of groove 50 so that the close fitting relation therebetween establishes the lateral or left to right position of the cartridge on surface 16. The lower edge 140 of the cartridge is adapted to fit between the latching and locating members 78 and 80, and the adjacent surface of members 32 and 34 to establish the vertical plane of the cartridge with respect to the projector surface 16. The cartridge has a slot or opening 142 which extends through both sides and the bottom of the cartridge and which is in alignment with slot 48 in compartment 30 so that suitable film stripping means (not shown) can pass through slots 48 and 142 for removing film from cartridge 130 when it is properly mounted on the projector.

There is an opening 144 through the cartridge for permitting passage of the spindle 18 into a hub portion of a reel, such as illustrated in 108 in FIG. 1. The opening 144 is closer to the lower edge of cartridge 130 than are the corresponding openings in cartridges 90 and 90' from their respective lower edges. As previously explained, the spindle 18 is moveable in an arcuate path downwardly from the position shown in FIG. 1 and, when it is in one of its lower positions, the axis of the spindle is aligned with opening 144. In view of the arcuate movement of the spindle, the axis of opening 144 is spaced from rib 134 by a distance which is greater than the spacing of the corresponding openings in cartridges 90 and 90' from their respective alignment ribs 100 and 100'.

The cartridge may include a generally arcuate rib 146 which has a radius of curvature and is dimensioned so that its lower edge can engage and rest on surfaces 55a and 55b on member 34. The rib includes a tongue portion 148 which is adapted to fit within slot 57 on member 34. These surfaces cooperate to limit downward movement of the cartridge and may be used for locating the cartridge on the projector. This configuration of the cartridge makes it interchangeable with cartridges of the type disclosed in the copending application entitled "Cartridge," Ser. No. 685,588. However, when used with a projector as shown at 10, the rib portions 146, 148 are not required for proper alignment or positioning of the cartridge.

The cartridge illustrated in FIG. 4 of the drawings is substantially identical to cartridge 130 shown in FIG. 3 and, accordingly, the part numbers used in FIG. 3 have been used in FIG. 4 together with a prime (') to designate the same or similar parts. In FIG. 4, the central hole or opening 144' through which the spindle projects is spaced at greater distance from the rib 134' than the corresponding opening 144 is spaced from 134 since the projector spindle moves in an arcuate path and is paced further from groove 50 when it is in its lowered position and aligned with opening 144'. The spacing between ribs 134' and 136' correspond to the spacing between grooves 50 and 52 and the length of rib 134' is the same as the length of ribs 134 and rib portions 100a and 100a'. The upper end 138' of rib 134' is adapted to engage the lower surface of latch and locating member 60 to establish the vertical position of cartridge 130' on surface 16.

As will be apparent from the foregoing description, the rib structures on the various sizes of cartridges which are adapted to be positioned in groove 50 are the same length so that when the cartridges are mounted against surface 16, the upper edge of each rib is engageable with the lower edge of latch member 60, and the lower edge of each cartridge is engaged by spring 74 for biasing the cartridges upwardly to establish and maintain contact between latch member 60 and the ribs. This permits the latch and locking members 78 and 80 to fit within the recesses at the bottom of each cartridge and prevent inadvertent movement of the cartridge away from surface 16 in a direction perpendicular to the surface 16. The door 40 enclosing chamber 30 also helps prevent the latter movement. Upward movement of the cartridge is prevented by latch member 60, and the orientation or rotational position of the cartridge in a plane substantially parallel to surface 16 is established and maintained by the close fitting relation between groove 50 and the cartridge rib which it receives. These features and interlocking structures are all that is required to properly mount a cartridge with respect to surface 16 out in either of two directions perpendicular to each other and substantially parallel to surface 16, and in a third direction perpendicular to surface 16. Thus, the ribs 102, 102', 136 and 136' and the groove 52 which receives these ribs are not necessary for proper alignment of the cartridge. However, these structural features are provided so that the cartridge may be substantially interchangeable with the cartridge disclosed in the earlier filed application for "Cartridge," Ser. No. 685,588, and used on the projector structure disclosed therein.

FIG. 5 of the drawings illustrates another embodiment of the invention which allows the cartridges shown in FIGS. 1—4 to be mounted on a projector by moving the cartridges along a projector surface in a direction which is perpendicular to the direction previously described in connection with FIG. 1. In FIG. 5 the projector is generally designated 150 and comprises an upper wall 152 and a substantially vertical wall 154 having a surface 156 against which the mounting face of the cartridge is adapted to be positioned when the cartridge is properly mounted on the projector. A spindle 158 is adapted to project through an elongate elliptical opening 160. The spindle is shown in its retracted position, and it is moved into this position by a lever 162 which slides through a slot 164 in wall 152 of the projector. The spindle can move downwardly from the position shown in an arcuate path in the manner previously described in connection with FIG. 1.

The lower portion of the cartridge is positionable within a chamber generally designated 166. The chamber is formed by projector wall 154, and end wall 168, a bottom wall 170, and an outer wall 172, the latter being spaced from projector wall 154. The right end of the chamber has an opening designated 174 through which the cartridge is inserted in a horizontal direction. The end wall 168 and the bottom wall 170 are provided with a slot 176 which allows a suitable stripping mechanism to pass into the chamber and through the cartridge for removing film on a reel in the cartridge. A leaf spring 180 projects from a recess 182 in bottom wall 170 of the chamber and is adapted to bear against the lower edge of a cartridge for biasing the cartridge upwardly.

Mounted on surface 156 at one end of chamber 166 is a plate 184. Along the right edge of the plate there is a series of spaced abutments 186. The outer edges of these abutments are substantially coplanar and are adapted to be engaged by the outer side edges 103, 103', 135 and 135' of the cartridge mounting ribs 100, 100', 134 and 134', respectively, to establish the rotational position or orientation of the cartridges on surface 156. Also projecting from the right edge of plate 184 is a locating member 188 having a triangular end portion with an inclined lower edge 190. The locating member 188 is positioned so that the top edge of rib members 100a, 100a', 134 and 134' engage the tapered surface as the cartridge is slid into the chamber from the right to urge the cartridge downwardly against spring 180. When the cartridge is fully mounted on the projector, the top of the locating ribs just mentioned bear against a straight, lower edge 192 of the locating member. Thus, the locating member establishes the vertical position of the cartridge along face 156, and the abutments 186 determine the transverse position of the cartridge.

A locating bar 200 extends transversely across surface 156 on both sides of opening 160. Bar 200 constitutes auxiliary means for establishing the vertical position of the cartridge on the projector and further provides means for guiding the cartridge into chamber 166 at a height or position with respect to wall 156 which allows the locating member 188 to be substantially aligned with the upper end of the rib structure on the cartridge. Bar 200 is substantially parallel to lower wall 170 of the chamber and it is adapted to be received in a complementary recess 202 on the cartridge 90 and a similar recess 202' on cartridge 90'. Cartridges 130 and 130' are provided with a projection 204 and 204' respectively having a straight upper edge 206 and 206' respectively. The edges 206 and 206' are engageable with the lower edge of bar 200 to limit upward movement of the cartridge within the chamber during mounting of the cartridge on the projector. While bar 200 and the corresponding cartridge surfaces could be used as the primary means for establishing the exact vertical position of the cartridge on the projector, it is preferred that the exact positioning of the cartridge be effected by means of the rib structure and cooperating locating means on the projector as previously described, since the rib structure used for locating is, in each instance, located on the lower half of the cartridge, whereas the surfaces which cooperate with bar 200 are or may be located on the upper half of a two-piece cartridge, and failure to obtain exact dimensional control between the two cartridge parts during manufacture could result in less than exact positioning of a two-piece cartridge. In other words, by having all locating structure on only one part of a cartridge, more exact positioning of the cartridge on the projector can be obtained. The auxiliary alignment means including bar 200 is beneficial for guiding movement of the cartridge and for obtaining approximate vertical positioning of the cartridge as it is slid from right to left through opening 174 into chamber 166.

A cartridge is held in mounted position within chamber 166 by a latch member 210 pivoted at 212 within the projector and having an end portion 214 projecting through a slot 216 in projector wall 154. The end portion 214 is generally hook shaped, as illustrated, and is adapted to bear against the inside edges (105, 105', 137 and 137') of the cartridge locating rib to urge the outside edge of such rib into engagement with the abutments 186 on plate 184. The other end portion 218 of the latch member projects through an arcuate slot 220 in projector wall 152. The end 214 of the latch member is retracted through slot 216 into the projector by moving end 218. When the cartridge is moved into engagement with abutments 186, the end 218 of the latch member is released and a spring diagrammatically shown at 222 biases the latch out of slot 216 and into engagement with the rib. During removal of the cartridge, the latch member may be moved to its retracted position either by manipulation of end portion 218 or simply by exerting sufficient pressure on the cartridge to overcome the biasing force of spring 222.

Preferably, the spindle is automatically extended when the cartridge is located in chamber 166. This may be effected by means of a latch release member 230 having an end portion projecting through a slot 232 in projector wall 154 so that is is engaged and deflected by the cartridge as the cartridge is moved into chamber 166. The latch release member may sense the presence of a cartridge and operate in a manner similar to the corresponding release means disclosed in the copending application entitled "Cartridge," Ser. No. 685,588. A spring diagrammatically shown at 233 biases the release member to its extended or sensing position shown in the drawings.

In order to mount a cartridge on projector 150, lever 162 is moved to the position illustrated to retract spindle 158, and the end portion 218 of the latch member 210 is swung to the left to retract the hook end 214 thereof into the projector. Next a cartridge is positioned at the right end of chamber 166 with the mounting surfaces of the cartridge facing the surface 156. Then the cartridge is moved to the left into the chamber with this movement being guided by bar 200 and the complementary portions of the cartridge, i.e., grooves 202 or 202' and edges 206 or 206'. When the locating rib of the cartridge engages release member 230, the spindle is released so that it can pass through the aligned opening in the cartridge and into the hub portion of a reel within the cartridge. As the cartridge approaches its innermost position in the chamber, surface 190 on locating member 188 will engage the top of the locating rib 100a' 100a', 134 or 134' on the cartridge and urge the cartridge downwardly against leaf spring 180. Ultimately, the lower edge 192 of the member bears against the upper end of the cartridge locating rib portion to establish exact vertical position of the cartridge with respect to surface 156. In order to permit some vertical movement of the cartridges 90 and 90' during this mounting operation, the dimensional relation between bar 200 and grooves 202 and 202' is preferably such as to allow some vertical movement of the cartridge with respect to the bar.

When the outer edges of the cartridge locating rib engages the abutments 186, the latch member 210 is released and spring 222 urges the hook end 214 against the inner edge of the cartridge rib to hold the cartridge in its mounted position.

From the foregoing description, it will be apparent that the projector mounting structures of FIGS. 1 and 5 each provide abutments against which the outer side edge 103 of cartridge 90 (and corresponding edges of the other cartridges) are engageable for locating the cartridge in one direction on the projector surface. Moreover, it will be apparent that for use with the mounting structures of FIGS. 1 and 5, the rib 100 and corresponding ribs on the other cartridges constitute the sole aligning and locating rib on the cartridges and that rib 102 and corresponding ribs could be omitted unless it is desired to provide a cartridge which can be mounted not only with the structures illustrated herein but also with the mounting means described in the copending patent application for "Cartridge," Ser. No. 685,588.

While the invention has been described in connection with the use of a cartridge on a motion picture projector, it will be understood that the cartridge construction and the means for locating same may be used on other apparatus, such as tape recorders.

I claim:

1. A cartridge adapted to be mounted on a motion picture projector or the like, the cartridge comprising:
    two separable cartridge parts jointly defining when assembled together two spaced and substantially parallel walls, means extending between said walls at edge portions thereof thereby to define a chamber within the cartridge for a roll of film or the like, one of said walls having a face thereon adapted to be positioned adjacent a surface of a projector when the cartridge is mounted on the projector;
    an elongate rib on said face projecting from said face, the width of said rib being substantially less than the width of said face;
    said rib having a first surface portion substantially parallel to the length of the rib, said surface portion being adapted to engage cooperating structure on the projector for locating the cartridge on the projector in a direction substantially perpendicular to the length of the rib; and
    said rib having a second surface portion substantially transverse to the length of the rib adapted to cooperate with means on the projector for limiting movement of the cartridge on the projector in a direction substantially parallel to the length of the rib.

2. A cartridge as set forth in claim 1, wherein said first surface portion comprises one side of said rib and said second surface portion comprises and end portion of said rib, said end portion of said rib being in spaced relation to said edge portions of said one wall.

3. A cartridge as set forth in claim 1, further comprising a third surface portion on said face adapted to cooperate with means on the projector for guiding the cartridge into its mounted position on the projector.

4. A cartridge as set forth in claim 1, wherein said first and second rib portions are integral with one of said parts.

5. A cartridge as set forth in claim 4, further comprising a third surface portion adapted to cooperate with means on the projector for guiding the cartridge into its mounted position on the projector, said third portion being integral with said one of said parts.

6. A cartridge as set forth in claim 4, further comprising a third surface portion adapted to cooperate with means on the projector for guiding the cartridge into its mounted position on the projector, said third portion being integral with the other of said cartridge parts.

7. A cartridge as set forth in claim 1, wherein said first surface portion of said rib constitutes the sole means on the cartridge for locating the cartridge on the projector in said direction perpendicular to said rib.

8. Means for locating a cartridge in a predetermined plane adjacent a surface of a projector or the like comprising:
    an elongate rib extending along a face of the cartridge and having a first surface portion substantially parallel to the length of the rib;
    means on said surface of the projector forming an abutment against which said first cartridge surface portion is engageable for locating the cartridge on the projector in said plane and for preventing movement of said cartridge in a direction substantially perpendicular to the length of said rib;
    said rib having a second surface portion transverse to the length of the rib;
    positioning means located on the projector surface with respect to said abutment so that said second surface portion on the rib is engageable with said positioning means when said first surface portion is in engagement with said abutment thereby to limit movement of the cartridge on the projector surface in a direction substantially parallel to the length of the rib;
    means on the projector for restraining movement of said cartridge out of said plane in a direction away from said surface; and
    means on said cartridge adapted to cooperate with said restraining means when said cartridge is located in said plane.

9. Locating means as set forth in claim 8, wherein said first surface portion of said rib constitutes the sole means on the cartridge for preventing movement of the cartridge in a direction perpendicular to the length of the rib.

10. Locating means as set forth in claim 8, wherein said first surface portion on said cartridge rib comprises one side edge of said rib, and said abutment extends from said projector surface in a direction substantially perpendicular to said plane.

11. Locating means as set forth in claim 10, further comprising means carried by said projector and engageable with said rib for holding said rib in contact with said abutment.

12. Locating means as set forth in claim 8, wherein said second surface portion comprises an end of said rib, said rib end being spaced from the edges of said cartridge.

13. Locating means as set forth in claim 8, further comprising means carried by said projector and engageable with said cartridge for biasing said second surface portion toward said positioning means.

14. Locating means as set forth in claim 8, wherein said positioning means has a tapered end portion engageable by said second surface portion during movement of the cartridge into position with respect to said surface, and cooperating guide means on said projector surface and said cartridge for guiding said second surface portion into engagement with said positioning means as the cartridge is mounted on the projector.

15. Locating means as set forth in claim 14, wherein the guide means on the projector comprises a bar projecting from said surface and extending along said surface in a direction substantially perpendicular to said abutment whereby said cartridge is guided into position on the cartridge in a direction perpendicular to the length of said rib.

16. Locating means as set forth in claim 8, wherein said positioning means comprises a projecting member rigidly mounted with respect to said abutment and projecting in a direction substantially perpendicular to said abutment.

17. Locating means as set forth in claim 8, wherein said positioning means comprises a latch member mounted for sliding movement in a direction substantially perpendicular to said abutment, and means operatively connected to said latch member for moving the latch member between (a) a retracted position wherein the latch member is positioned with respect to the abutment to allow movement of the cartridge in a direction parallel to the length of the rib along said abutment during mounting of the cartridge on the projector and (b) an extended position wherein the latch member is positioned with respect to said abutment to be engaged by an end of said rib.

18. A motion picture projector adapted to receive and mount on a surface thereof a cartridge containing a reel of motion picture film, said projector comprising:

means on said projector defining a chamber adapted to receive and hold a cartridge adjacent said surface, said chamber-defining means forming an opening through which a cartridge can be inserted during mounting of the cartridge onto the projector;

a spindle adapted to support the reel within the cartridge, said spindle being mounted for movement between (a) an extended position wherein it is engageable with a reel in a cartridge positioned within said chamber and (b) a retracted position wherein the spindle is located with respect to said surface to allow free movement of the cartridge into or out of the chamber in a direction transverse to the axis of the spindle;

means on the projector adapted to cooperate with means on the cartridge for accurately locating the cartridge on the projector in the desired position with respect to the spindle, said locating means comprising (a) an elongate abutment against which a first surface on the cartridge is engageable for locating the cartridge in a first direction on the projector and (b) a member at one end of said abutment against which a second surface of the cartridge is engageable for locating the cartridge in a second direction on the cartridge;

means carried by the projector and engageable with the cartridge for holding the first surface of the cartridge against said abutment; and means carried by the projector and engageable with the cartridge for holding the second surface of the cartridge against said member at the end of the abutment.

19. A projector as set forth in claim 18, further comprising means mounting said member at the end of the abutment for movement in a direction transverse to the length of said abutment into a position with respect to said abutment to allow loading of the cartridge on the projector in a direction parallel to the length of said abutment, and means biasing said member into a normal position with respect to said abutment to prevent such loading of the cartridge or removal of the cartridge from the projector.

20. A projector as set forth in claim 18, wherein said opening into the chamber is located with respect to said abutment to permit loading of the cartridge into the chamber in a direction transverse to the length of the abutment, said projector further comprising means on said projector for guiding the cartridge from the opening into the chamber into engagement with the abutment.

21. A projector as set forth in claim 18, wherein said opening into the chamber is located with respect to said abutment to permit loading of the cartridge into the chamber in a direction substantially parallel to said abutment.